United States Patent [19]

Ross et al.

[11] Patent Number: 5,242,226
[45] Date of Patent: Sep. 7, 1993

[54] TEMPERATURE-MEASURING INSTRUMENT

[75] Inventors: Bernd Ross, Oberhausen, Fed. Rep. of Germany; Walter Koschnitzke, deceased, late of Oberhausen, Fed. Rep. of Germany, by Elisabeth Becker-Koschnitzke, executrix

[73] Assignee: Hoechst Aktiengesellschaft, Fed. Rep. of Germany

[21] Appl. No.: 919,095

[22] Filed: Jul. 23, 1992

[30] Foreign Application Priority Data

Jul. 27, 1991 [DE] Fed. Rep. of Germany ....... 9109308

[51] Int. Cl.$^5$ .......................... G01K 1/10; G01K 1/12; G01K 7/04; G01K 7/06
[52] U.S. Cl. .................................... 374/208; 374/179; 136/233
[58] Field of Search ................ 374/179, 208; 136/232, 136/233, 234

[56] References Cited

U.S. PATENT DOCUMENTS

| | | | |
|---|---|---|---|
| 2,177,033 | 10/1939 | Buell | 136/232 |
| 2,870,233 | 1/1959 | Comer | 374/179 |
| 2,875,614 | 3/1959 | Dobrin et al. | |
| 3,106,493 | 10/1963 | Japka | |
| 3,530,716 | 9/1970 | Truppe et al. | 136/234 |
| 3,647,558 | 3/1972 | McMurtry | 136/234 |
| 3,647,559 | 3/1972 | Truppe et al. | 136/234 |
| 3,913,058 | 10/1975 | Nishio et al. | 374/144 |
| 4,018,624 | 4/1977 | Rizzolo | 136/232 |
| 4,428,686 | 1/1984 | Brax | 136/234 |
| 4,485,263 | 11/1984 | Itoyama et al. | 374/208 |
| 4,721,533 | 1/1988 | Phillippi et al. | 374/179 |
| 4,721,534 | 1/1988 | Phillippi et al. | 136/232 |
| 4,891,252 | 1/1990 | Kaiser, Jr. | 374/208 |
| 4,958,938 | 9/1990 | Schwartz et al. | 374/208 |
| 4,977,001 | 12/1990 | Greenspan | 374/208 |
| 4,984,904 | 1/1991 | Nakano et al. | 136/232 |
| 5,005,986 | 4/1991 | Najjar et al. | 136/234 |
| 5,071,258 | 12/1991 | Usher et al. | 136/232 |
| 5,139,345 | 8/1992 | Schafer et al. | 374/179 |

FOREIGN PATENT DOCUMENTS

| | | | |
|---|---|---|---|
| 0243407 | 3/1987 | Fed. Rep. of Germany | 374/208 |
| 0028234 | 2/1982 | Japan | 374/179 |
| 0086725 | 5/1982 | Japan | 374/179 |
| 092002794 | 2/1992 | PCT Int'l Appl. | 374/179 |
| 2115550 | 9/1983 | United Kingdom | 374/208 |

*Primary Examiner*—William A. Cuchlinski, Jr.
*Assistant Examiner*—Diego F. F. Gutierrez
*Attorney, Agent, or Firm*—Jordan B. Bierman

[57] ABSTRACT

A temperature-measuring instrument especially for measuring high temperatures in pressure reactors. It comprises a sheathed thermocouple which is mounted in an inner ceramic element which is closed at one end. This inner element is inserted into a molybdenum element which is also closed at the same end and is surrounded in turn by an outer ceramic element. The annular space between the molybdenum element and the ceramic element is filled with a pressed ceramic mass. A flanged joint joins the molybdenum element to a ball joint which is in turn joined via bellows to a pressure-resistant bushing.

10 Claims, 1 Drawing Sheet

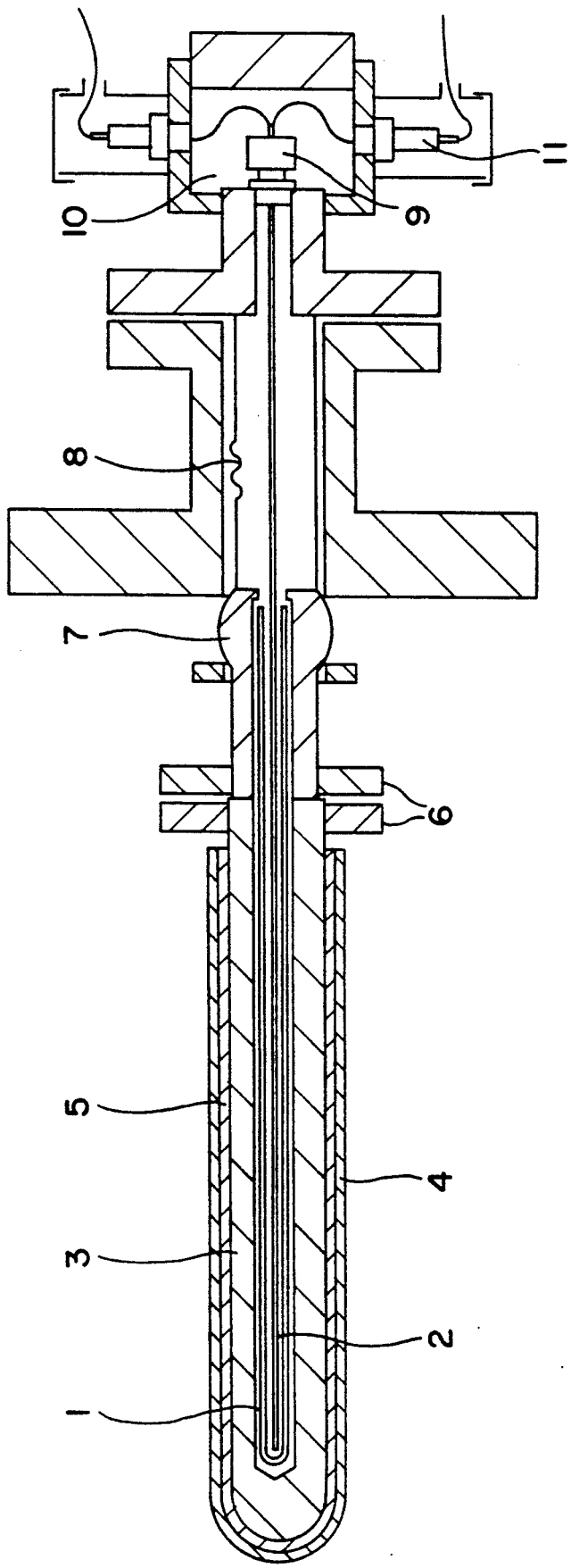

TEMPERATURE-MEASURING INSTRUMENT

This Application claims the benefit of the priority of German Application G 91 09 308.2, filed Jul. 27, 1991, presently pending.

The invention relates to an instrument for measuring high temperature in pressure reactors, especially in pressure gasification reactors. It comprises a sheathed thermocouple which is mounted in at least one metal protective tube and sealed in a pressure-tight manner against the reaction medium or the reactor atmosphere.

BACKGROUND OF THE INVENTION

Thermocouples are often used in process engineering for temperature measurement. Their mode of operation is based on the thermoelectric effect; i.e. current flows in a circuit if its conductors are composed of two different metals or alloys and the contact points (solder joints) of the different metals or alloys are held at different temperatures. With such a circuit, it is possible to measure a voltage which is proportional to the difference in temperature of the two solder joints. In practice, one solder joint is kept at constant temperature and the other joint is the sensor at the point of measurement.

Suitable thermocouples and the basic values of the associated thermoelectric voltages have been standardized. Such thermocouples are particularly useful at very high temperatures and where the measurements are to be made at inaccessible points. In addition, by a suitable choice of thermocouples, it is possible to solve individual measurement problems and to cover fixed temperature ranges. For best results, it is desirable that the thermoelectric voltage per degree of temperature difference be as high and as a linear as possible.

To prevent thermocouples being damaged, altered, or destroyed by corrosive media in reaction spaces, they are protected by metal or ceramic tubes. In this case, they are called sheathed thermocouples. The thermocouple pair is mutually insulated by small ceramic tubes and inserted into a tube closed at one end. The outer tube provides protection from mechanical stresses; inner protection tubes are particularly useful for preventing the inward diffusion of gases which can affect the thermoelectric properties of the metal pair. The aforementioned resistance to mechanical and chemical influences represents merely a basic requirement which must be met by thermocouples used in industrial practice.

However, in special cases, such temperature-measurement instruments must meet additional requirements. An example of such a special case is a brick-lined high-temperature reactor which is used for the production of synthesis gas by gasification of fossil fuels such as oil or bituminous coal. In these reactors, the brick lining suffers gradual wear. To prevent destruction of the steel shell of the reactor by overheating, the wall thickness of the brick-lining must not fall below a certain minimum. In those gasification plants which, depending on the feed material, are operated at temperatures from about 1000° C. to about 1700° C., very accurate temperature measurement is necessary because of the high sensitivity of the brick-lining even where the permissible temperature is slightly exceeded. Specifically, the maximum margin of error must not exceed about 10° C.

For measuring temperatures in this range, platinum-rhodium-platinum thermocouples are preferable. They are usually sheathed with a tube of alumina and are surrounded by an outer protective tube, usually of a ceramic material such as alumina.

In gasification plants, platinum-rhodium-platinum thermocouples are subject to damage by the reactor atmosphere. Due to the high pressure of up to about 10 MPa, it is unavoidable that the reaction gases, in particular hydrogen, carbon monoxide and gaseous sulfur compounds, reach the thermocouple. Hydrogen leads to grain boundary growth of the thermocouple material, the sulfur compounds cause embrittlement thereof, and both causes lead to destruction of the thermocouple, or at least to a falsification of the temperature measured thereby.

In the gasification of bituminous coal, in which slag is formed, slag can additionally penetrate the protective tubes and impair the strength of the alumina by lowering its melting point. This considerably facilitates access of hydrogen and gaseous sulfur compounds to the thermocouple. The same problems arise in the use of protective tubes which are composed of refractory metals or other ceramic materials.

SUMMARY OF THE INVENTION

It is therefore the object of the invention to develop a measuring instrument by which the temperature in the reaction space of pressure reactors can be measured over long periods of time as accurately as possible substantially unaffected by the reaction medium and the reaction atmosphere.

BRIEF DESCRIPTION OF THE DRAWING

In the accompanying drawing, constituting a part hereof and in which like reference characters indicate like parts, The FIGURE is a cross section of the thermocouple of the present invention.

DETAILED DESCRIPTION OF THE INVENTION

The novel temperature-measuring instrument is distinguished by outstanding pressure tightness and resistance to corrosive or damaging media. It is more reliable and accurate, over a significantly longer period, than conventional instruments of the same general type. The instrument is particularly suitable for measuring temperatures between about 1000° C. and 1700° C. However, it can of course also be used for the determination of lower temperatures, especially if the circumstances under which the measurement is carried out require particularly pressure-tight and resistant sheathed thermocouples.

According to the invention, the thermocouple is mounted in a tube which is closed at one end and is composed of a ceramic material (the inner ceramic tube). Alumina has proven particularly suitable as the tube material. The temperature measurement is effected by conventional thermocouples suitable for the particular measuring range. The platinum/rhodium combination, which gives an adequately high thermal voltage between 1000° C. and 1700° C., is preferred. The thermocouple wires are insulated from one another, for example by heat-resistant coatings; for this purpose also, ceramic materials, especially alumina, are preferred.

The inner ceramic tube is surrounded by a pressure-tight tubular metal sheath, against which the ceramic tube bears slidingly, to take into account the different coefficients of thermal expansion of the materials. This metal sheath is composed of substantially pure molybdenum which is an easily worked material and largely resists the effects of reducing media such as are present in gasification reactors. The sheath thickness depends on the type of use; in general, it is 5 to 20 mm, but greater or smaller wall thicknesses are not excluded.

Over the molybdenum tube, an outer ceramic tube is concentrically arranged in such a way that an annular space is formed between the molybdenum tube and the outer ceramic tube. This annular space is filled with a pressed ceramic mass and fixes the outer ceramic tube. Zirconium dioxide has proven particularly suitable for this purpose.

Among the various materials of which the outer ceramic tube can be composed, alumina is again preferred. The tube also has a protective function and serves, in particular, to keep oxygen away from the molybdenum tube. When used in coal gasification reactors, its effectiveness can be assisted by deposition of solids which form when the molten slag constituents of the coal cool down.

In order to compensate for movements of the reactor brick-lining, the temperature-measuring instrument according to the invention is spherically mounted. For this purpose, the molybdenum tube is joined via a flange to a ball joint. The preferred materials for the ball element are nickel alloys, for example those available under the trade mark Hastalloy. To ensure mobility in spite of pressure tightness throughout, the ball joint and the first pressure-resistant bushing are joined via bellows. The bellows are preferably made of a nickel alloy. The sealing of the connection space from the external atmosphere is effected by a second pressure-resistant bushing or commercially available spark plug 11. The first pressure-resistant bushing seals the space from the bellows.

Inner ceramic tube 1, closed at one end, contains sheathed thermocouple 2 and is located in molybdenum tube 3, similarly closed at one end, whereby the outer surface of ceramic tube 1 slides on the inner surface of molybdenum tube 3. Outer ceramic tube 4 is placed concentrically around molybdenum tube 3, leaving an annular space therebetween. The space is filled with pressed ceramic mass 5 which serves to fix ceramic tube 4. At its open end, molybdenum tube 3 is mounted on ball joint 7 via flanged joint 6. To ensure mobility in spite of pressure tightness throughout, ball joint 7 is connected to first pressure-resistant bushing 9 by bellows 8. Connection space 10 is sealed by commercially available spark plug 11.

While only a limited number of embodiments of the present invention have been expressly described, it is, nonetheless, to be broadly construed and not to be limited except by the character of the claims appended hereto.

What we claim is:

1. A temperature measuring instrument for operation in a surrounding medium comprising a thermocouple covered by a sheath, an inner ceramic element closed at one end and surrounding said thermocouple, a molybdenum element substantially complementary to and surrounding said inner ceramic element and closed at an adjacent end adjacent said one end, an outer surface of said inner ceramic element slidingly bearing against an inner surface of said molybdenum element, an outer ceramic element closed adjacent said one end and substantially complementary to and surrounding said molybdenum element and spaced apart therefrom to form a space between an outer surface of said molybdenum element and an inner surface of said outer element, a pressed ceramic mass in said space, a flanged joint between a flange end of said molybdenum element remote from said one end and a near end of a ball joint, and a bellows joining the other end of said ball joint to a pressure resistant bushing.

2. The instrument of claim 1 wherein said inner element, said molybdenum element, and said outer element are tubular in shape and said outer element is radially spaced apart from said molybdenum element.

3. The instrument of claim 1 wherein said inner element is of alumina.

4. The instrument of claim 3 wherein said outer element is composed of alumina.

5. The instrument of claim 1 wherein said outer element is composed of alumina.

6. The instrument of claim 1 said pressed mass is of $ZrO_2$.

7. The instrument of claim 1 wherein said ball joint is of a nickel alloy.

8. The instrument of claim 1 wherein said bellows is of a nickel alloy.

9. The instrument of claim 1 wherein said molybdenum element is 5 to 20 mm in thickness.

10. The instrument of claim 1 wherein said pressure resistant bushing is adjacent a connection space and a spark plug seals said space from said medium.

* * * * *